(12) United States Patent
Hong (10) Patent No.: US 12,253,410 B2
(45) Date of Patent: Mar. 18, 2025

(54) METHOD FOR IMPROVING PERFORMANCE OF AVERAGER

(71) Applicant: ANPEC ELECTRONICS CORPORATION, Hsinchu (TW)

(72) Inventor: Jia-Hua Hong, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 379 days.

(21) Appl. No.: 17/575,584

(22) Filed: Jan. 13, 2022

(65) Prior Publication Data

US 2023/0117278 A1 Apr. 20, 2023

(30) Foreign Application Priority Data

Oct. 20, 2021 (TW) .................................. 110138795

(51) Int. Cl.
  *G01J 1/42* (2006.01)
(52) U.S. Cl.
  CPC .................................. *G01J 1/4204* (2013.01)
(58) Field of Classification Search
  CPC .................................................... G01J 1/4204
  USPC ........................................................ 702/189
  See application file for complete search history.

(56) References Cited

U.S. PATENT DOCUMENTS

| | | | | |
|---|---|---|---|---|
| 6,522,355 | B1* | 2/2003 | Hynecek | H04N 25/63 348/E5.081 |
| 9,417,188 | B2* | 8/2016 | Ishihara | A61B 1/043 |
| 2008/0129367 | A1* | 6/2008 | Murata | G06T 5/20 327/551 |
| 2013/0093930 | A1* | 4/2013 | Mihara | H04N 23/71 348/294 |
| 2020/0088853 | A1* | 3/2020 | Kubota | G01S 7/4865 |
| 2020/0228678 | A1* | 7/2020 | Ikari | H04N 1/4053 |

\* cited by examiner

*Primary Examiner* — Ricky Go
(74) *Attorney, Agent, or Firm* — Li & Cai Intellectual Property Office (57) ABSTRACT

A method of improving performance of an averager is provided. The method includes steps of: (a) multiplying a value of a (n−1)th piece of output data by a value "N" to calculate a temporary value; (b) determining whether or not a difference between an nth piece of input data and the (n−1)th piece of output data is larger than or smaller than a zero value, if yes, compensating the temporary value to obtain a correction value and performing step (c), if no, setting the correction value and performing step (c); (c) dividing the correction value by the value "N" to obtain a first value; (d) subtracting the first value from the correction value and adding up the correction value and the nth piece of input data to obtain a second value; and (e) dividing the second value by the value "N" to calculate an output value of the averager.

4 Claims, 5 Drawing Sheets

METHOD FOR IMPROVING PERFORMANCE OF AVERAGER

CROSS-REFERENCE TO RELATED PATENT APPLICATION

This application claims the benefit of priority to Taiwan Patent Application No. 110138795, filed on Oct. 20, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an averager, and more particularly to a method for improving performance of an averager that is applicable to an ambient light sensor and a proximity sensor.

BACKGROUND OF THE DISCLOSURE

Under different environments, different brightness is required for the human eye when viewing a screen of an electronic product. Therefore, ambient light sensors, proximity sensors and other various sensors including photoelectric components are widely applied to electronic products such as mobile phones. The brightness of the screen of the electronic product can be automatically adjusted according to a value sensed by the sensor, such that the eyes can feel comfortable anywhere during use of the electronic product. The sensor may sense an ambient light multiple times to generate multiple values within a time interval and inputs the sensed values to an averager. The averager may calculate an average value of the sensed values. For example, the sensed value of the ambient light sensor or the proximity sensor can represent an averaged ambient light intensity within the time interval.

SUMMARY OF THE DISCLOSURE

In response to the above-referenced technical inadequacies, the present disclosure provides a method of improving performance of an averager, which is applicable to a sensor. The sensor senses n pieces of sensing data and inputs the n pieces of sensing data to the averager as n pieces of input data. The averager sequentially reads the n pieces of input data, and the number of the sensing data is an integer. The method includes the following steps: (a) setting a compensation coefficient and a threshold coefficient; (b) calculating a difference between an nth piece of the input data of the averager and a (n−1)th piece of output data of the averager; (c) determining whether or not an absolute value of the difference is larger than the threshold coefficient, in response to determining that the absolute value of the difference is larger than the threshold coefficient, multiplying a value of the nth piece of input data being currently read by the averager by a value "N" to calculate a correction value and then sequentially performing steps (h) to (k), and in response to determining that the absolute value of the difference is not larger than the threshold coefficient, performing step (d); (d) multiplying a value of the (n−1)th piece of output data by the value "N" to calculate a temporary value; (e) determining whether or not the difference is larger than a reference value, in response to determining that the difference is larger than the reference value, subtracting the compensation coefficient from the temporary value to calculate the correction value and then sequentially performing steps (h) to (k), and in response to determining that the difference is not larger than the reference value, performing step (f); (f) determining whether or not the difference is smaller than the reference value, in response to determining that the difference is smaller than the reference value, adding up the temporary value and the compensation coefficient to calculate the correction value and then sequentially performing steps (h) to (k), and in response to determining that the difference is not smaller than the reference value, performing step (g); (g) using the temporary value as the correction value of an nth piece of data and then sequentially performing steps (h) to (k); (h) dividing the correction value of the nth piece of data by the value "N" to calculate a first calculated value; (i) subtracting the first calculated value from the correction value of the nth piece of data to calculate a second calculated value; (j) adding up the second calculated value and the value of the nth piece of input data to calculate a third calculated value; and (k) dividing the third calculated value by the value "N" to calculate an output value of the averager.

In certain embodiments, the method further includes the following step: (l) setting the reference value to be a zero value.

In certain embodiments, the method further includes the following steps: (m) setting a positive threshold coefficient and a negative threshold coefficient; (n) determining whether or not the difference is larger than the positive threshold coefficient or smaller than the negative threshold coefficient, in response to determining that the difference is larger than the positive threshold coefficient or smaller than the negative threshold coefficient, multiplying the value of the nth piece of input data being currently read by the value "N" to calculate the correction value and then sequentially performing steps (h) to (k), and in response to determining that the difference is not larger than the positive threshold coefficient and is not smaller than the negative threshold coefficient, performing step (d).

In certain embodiments, the method further includes the following step: (o) setting a value of the positive threshold coefficient to be equal to a value of the negative threshold coefficient.

In certain embodiments, the method further includes the following steps: (p) calculating a change in an amplitude of the nth piece of input data; and (q) dynamically adjusting the compensation coefficient according to the change in the amplitude of the nth piece of input data.

In certain embodiments, the method further includes the following steps: (r) calculating a change in an amplitude of the nth piece of input data; and (s) dynamically adjusting the threshold coefficient according to the change in the amplitude of the nth piece of input data.

As described above, the present disclosure provides the method of improving performance of the averager, which has the following characteristics:

1. the sensor such as the ambient light sensor or the proximity sensor senses the multiple pieces of sensing data, and inputs the multiple pieces of sensing data to the averager as the multiple pieces of input data;

2. the compensation coefficient and the threshold coefficient are set and used to reduce effects of noise on the output value of the averager;
3. the compensation coefficient and the threshold coefficient are automatically updated in real time according to the change in the amplitude of the input data;
4. only a short period of time is required for performing the simple arithmetic operations on the piece of input data being currently read and the previous piece of input data, and only a small amount of a space of a register need be occupied;
5. a digital filter or other digital processors can be used together with the averager to perform operations on the data; and
6. the method of the present disclosure can be performed by a digital hardware circuit or software.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 1:
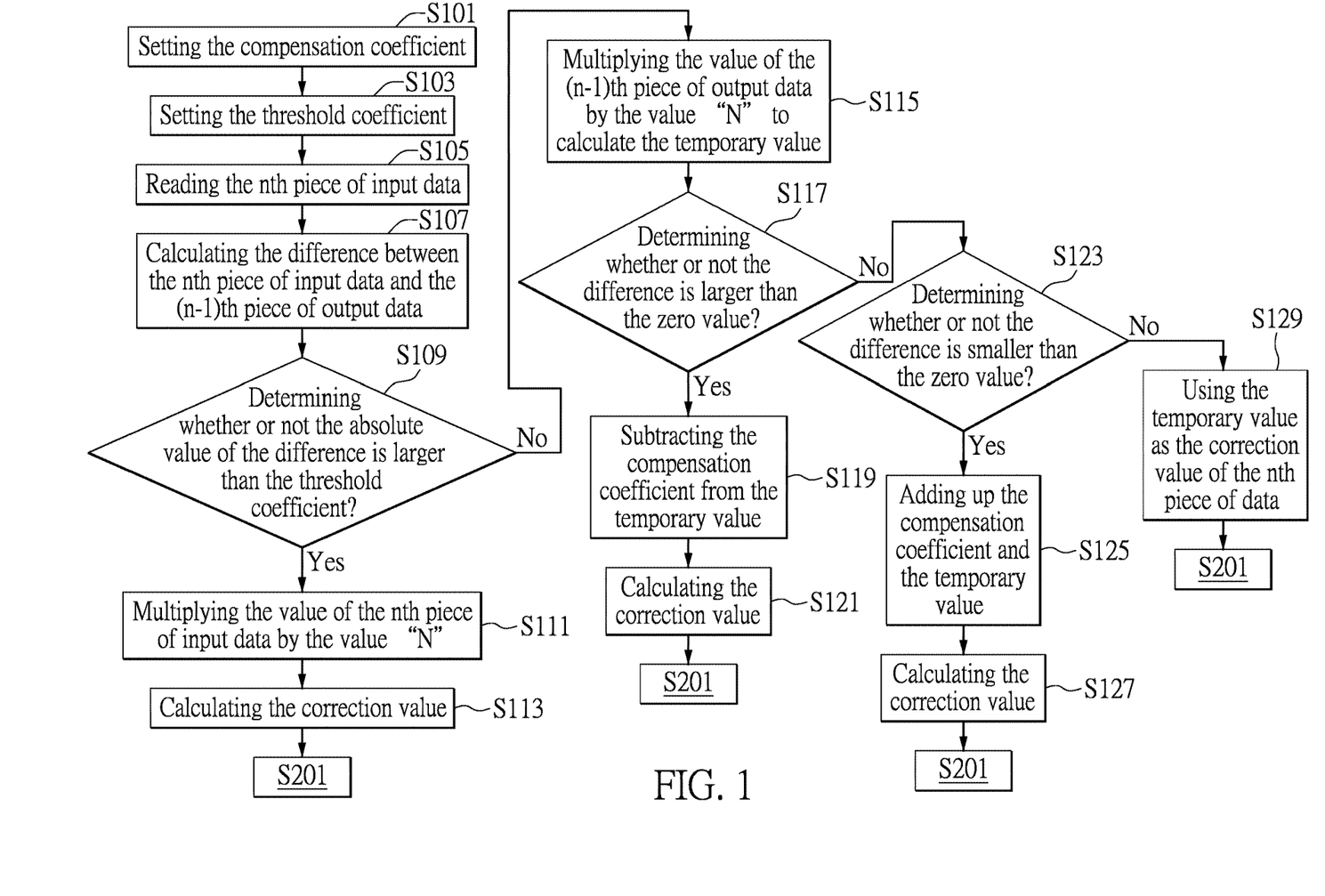
FIG. 1 is a first flowchart diagram of a method of improving performance of an averager according to an embodiment of the present disclosure.
Figure 4:
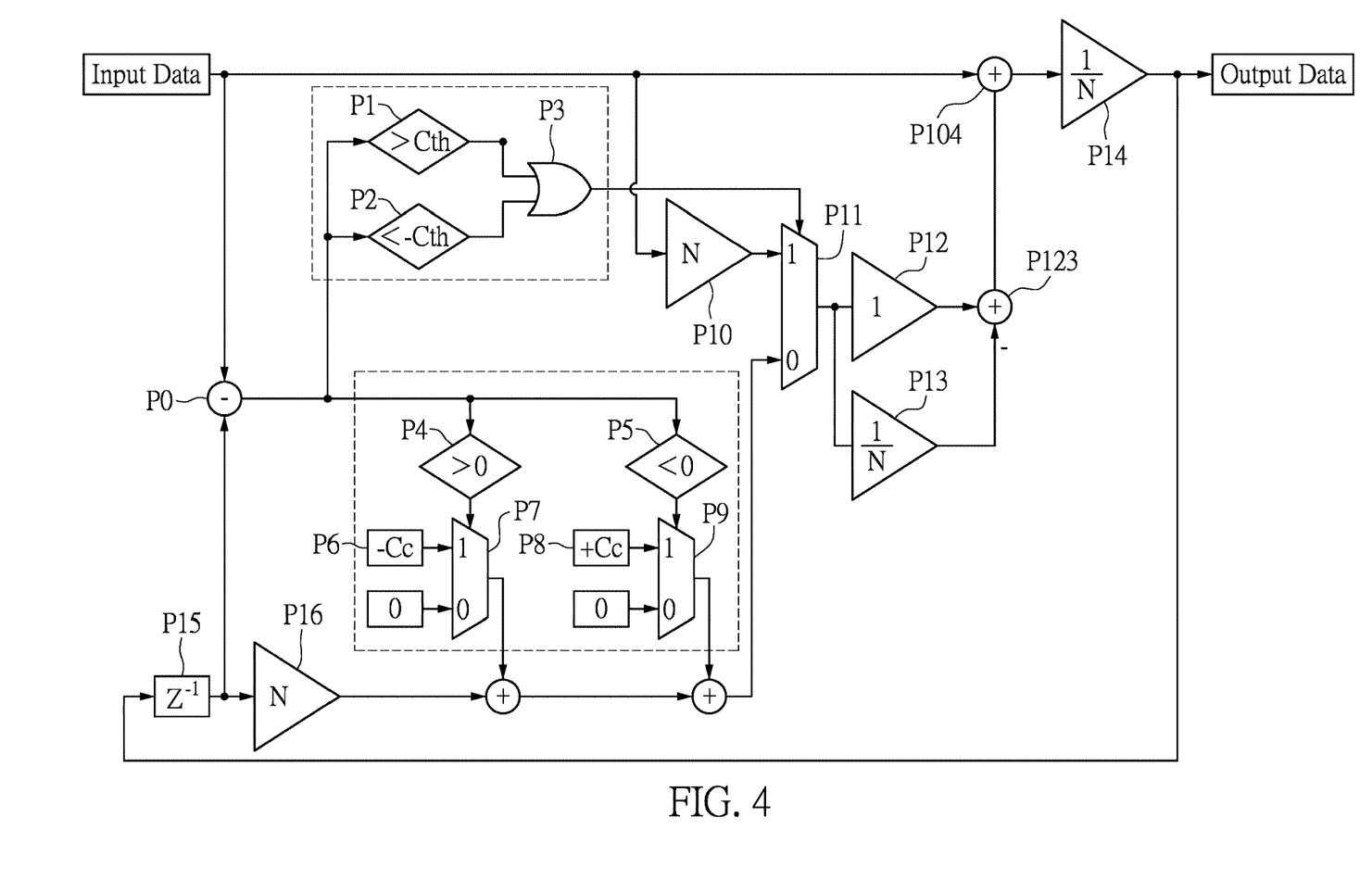
FIG. 4 is a schematic diagram of a computing architecture of the method of improving performance of the averager according to the embodiment of the present disclosure.

Reference is made to FIGS. 1 and 4, in which FIG. 1 is a first flowchart diagram of a method of improving performance of an averager according to an embodiment of the present disclosure, and FIG. 4 is a schematic diagram of a computing architecture of the method of improving performance of the averager according to the embodiment of the present disclosure.

In the embodiment of the present disclosure, the method of improving performance of the averager may include steps S101 to S129 as shown in FIG. 1. Steps S101 to S129 are applicable to sensors. For example, the sensors may be ambient light sensors, proximity sensors, or other sensors including photoelectric components. The sensor senses n pieces of sensing data respectively as n pieces of input data of the averager. The number of the sensing data is an integer.

Steps S101 to S129 can be performed by the computing architecture as shown in FIG. 4 to calculate a correction value, which is specifically described in the following.

In step S101, a compensation coefficient is set according to actual requirements.

In step S103, a threshold coefficient is set according to actual requirements. Alternatively, a positive threshold coefficient and a negative threshold coefficient are set. A value of the positive threshold coefficient may be equal to a value of the negative threshold coefficient. That is, an absolute value of the negative threshold coefficient is equal to the positive threshold coefficient.

In step S105, an nth piece of input data is read. The number of the sensing data is an integer.

In step S107, a difference between a value of the nth piece of input data of the averager and a value of a (n−1)th piece of output data of the averager is calculated, which is represented by the following equation:

$$Df = Din(n) - Dout(n-1),$$

in which Df represents the difference between the nth piece of input data of the averager and the (n−1)th piece of output data of the averager, the difference may be a positive value or a negative value, Din (n) represents the value of the nth piece of input data of the averager, and Dout(n−1) represents the the value of the (n−1)th piece of output data of the averager.

That is, as shown in FIG. 4, after the averager reads a previous piece of input data, the averager outputs a previous piece of output data. In a stage P15, a value of the previous piece of output data is obtained. Then, in a stage P0, the value of the previous piece of output value of the averager is subtracted from a value of a piece of input data that is currently read by the averager (by a subtractor).

In step S109, it is determined whether or not an absolute value of the difference is larger than the threshold coefficient set in step S103, which is represented by the following equation:

$$|Df|>Cth,$$

in which |Df| represents the absolute value of the difference between the nth piece of input data of the averager and the (n−1)th piece of output data of the averager, and Cth represents the threshold coefficient.

If the difference between the value of the nth piece of input data and the value of the (n−1)th piece of output data is larger than the threshold coefficient, steps S111 and S113 are sequentially performed. After the correction value is calculated in steps S111 and S113, step S201 is performed. In other words, as shown in FIG. 4, if the difference between the value of the nth piece of input data and the value of the (n−1)th piece of output data is larger than a positive threshold coefficient Cth in a stage P1 or is smaller than a negative threshold coefficient −Cth in a stage P2, an OR gate outputs a logic value "1" in a stage P3 and then stages P10 to P14 are sequentially performed.

Conversely, if the difference between the value of the nth piece of input data and the value of the (n−1)th piece of output data is not larger than the threshold coefficient, steps S115 and S117 are sequentially performed.

In step S111, the value of the nth piece of input data being read currently by the averager is multiplied by a value "N" to calculate the correction value in step S113, which is represented by the following equation:

$$Reg(n)=N \times Din(n),$$

in which Reg(n) represents the correction value of the nth piece of data, N represents the number of data of the averager and may be any suitable value, and Din (n) represents the value of the nth piece of input data of the averager.

In step S115, the value of the (n−1)th piece of output data is multiplied by the value "N" to calculate a temporary value.

In step S117, it is determined whether or not the difference between the nth piece of input data of the averager and the (n−1)th piece of output data of the averager is larger than a reference value such as a zero value as represented by the following equation:

$$Df>0,$$

in which Df represents the difference between the nth piece of input data of the averager and the (n−1)th piece of output data of the averager, and the difference may be the positive value or the negative value.

If the difference between the nth piece of input data of the averager and the (n−1)th piece of output data of the averager is larger than the reference value such as the zero value, steps S119 and S121 are sequentially performed. After the correction value is calculated, step S201 is performed. Conversely, if the difference between the nth piece of input data of the averager and the (n−1)th piece of output data of the averager is not larger than the reference value such as the zero value, step S123 is performed.

In step S119, the compensation coefficient is subtracted from the temporary value that is equal to the value "N" multiplied by the value of the (n−1)th piece of output data as in step S115 to calculate the correction value in step S121, which is represented by the following equation:

$$Reg(n)=N \times Dout(n-1)-Cc,$$

in which Reg(n) represents the correction value of the nth piece of data, N represents the number of data of the averager, Dout(n−1) represents the value of the (n−1)th piece of output data, the value "N" multiplied by the value Dout(n−1) represents the temporary value, and Cc represents the compensation coefficient.

As shown in FIG. 4, the difference between the nth piece of input data of the averager and the (n−1)th piece of output data of the averager is calculated in the stage P0. If it is determined that the difference is larger than the zero value in a stage P4, a stage P16 is performed. In the stage P16, the value of the (n−1)th piece of output data in the stage P15 is multiplied by the value "N" to calculate the temporary value. Then, the temporary value and a negative compensation coefficient-Cc are added up, or a positive compensation coefficient Cc is subtracted from the temporary value in stages P6 and P7, to output the correction value in a stage P11.

In step S123, it is determined whether or not the difference between the value of the nth piece of input data and the value of the (n−1)th piece of output data is smaller than the reference value such as the zero value as represented by the following equation:

$$Df<0,$$

in which Df represents the difference between the nth piece of input data of the averager and the (n−1)th piece of output data of the averager, and the difference may be the positive value or the negative value.

If it is determined that the difference between the value of the nth piece of input data and the value of the (n−1)th piece of output data is smaller than the reference value such as the zero value, steps S125 and S127 are sequentially performed. After the correction value is calculated in steps S125 and S127, step S201 is performed. Conversely, if the difference between the value of the nth piece of input data and the value of the (n−1)th piece of output data is not larger than and not smaller than the reference value such as the zero value, the difference is equal to the reference value such as the zero value. Under this condition, step S129 is performed, and then step S201 is performed.

In step S125, the compensation coefficient is added to the temporary value that is equal to the value "N" multiplied by the value of the (n−1)th piece of output data in step S115, to calculate the correction value in step S127, which is represented by the following equation:

$$Reg(n)=N \times Dout(n-1)+Cc,$$

in which Reg(n) represents the correction value of the nth piece of data, N represents the number of data of the averager, Dout(n−1) represents the value of the (n−1)th piece of output data, the value "N" multiplied by the value Dout(n−1) represents the temporary value, and Cc represents the compensation coefficient.

As shown in FIG. 4, the difference between the nth piece of input data of the averager and the (n−1)th piece of output data of the averager is calculated in the stage P0. If it is determined that the difference is smaller than the zero value in a stage P5, the stage P16 is performed. In the stage P16, the value of the (n−1)th piece of output data that in the stage P15 is multiplied by the value "N" to calculate the temporary value. Then, the temporary value and the positive compensation coefficient Cc are added up in stages P8 and P9, to output the correction value in the stage P11.

In step S129, the temporary value calculated in step S115 is used as the correction value of the nth piece of data, which is represented by the following equation:

Reg(n)=N× Dout(n−1), in which Reg(n) represents the correction value of the nth piece of data, N represents the number of data of the averager, Dout(n−1) represents the value of the (n−1)th piece of output data, and the value "N" multiplied by the value Dout(n−1) represents the temporary value.

Figure 2:
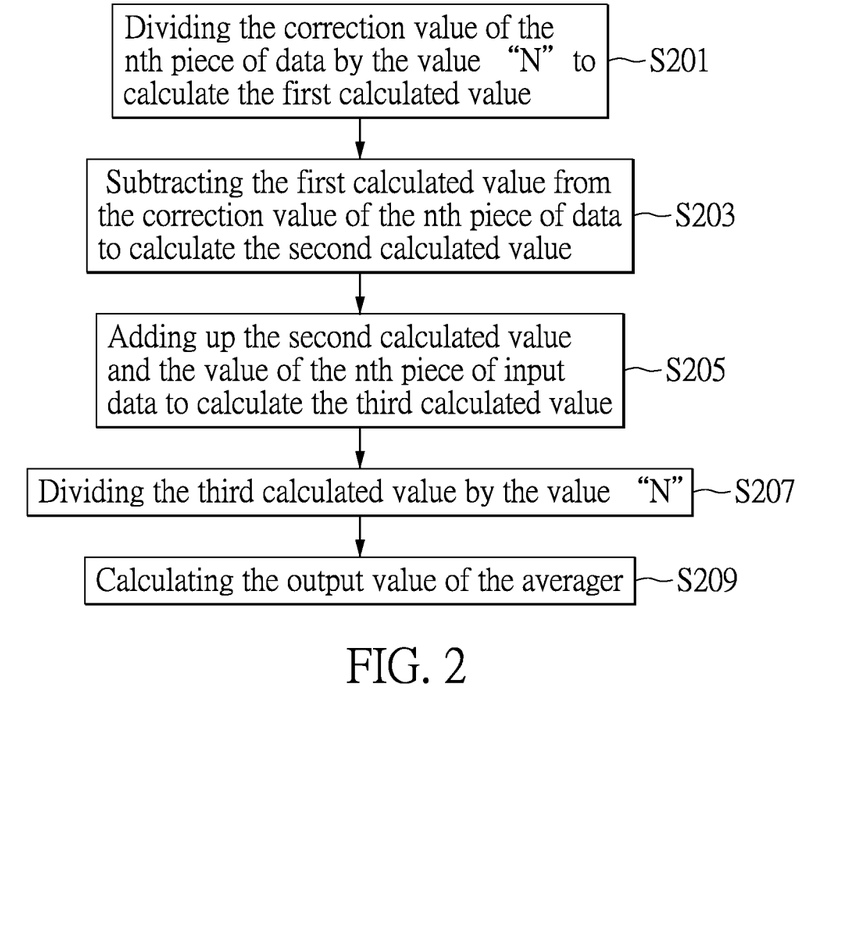
FIG. 2 is a second flowchart diagram of the method of improving performance of the averager according to the embodiment of the present disclosure.

Reference is made to FIGS. 2 and 4, in which FIG. 2 is a second flowchart diagram of the method of improving performance of the averager according to the embodiment of the present disclosure, and FIG. 4 is a schematic diagram of a computing architecture of the method of improving performance of the averager according to the embodiment of the present disclosure.

In the embodiment of the present disclosure, the method of improving performance of the averager may include steps S201 to S209 as shown in FIG. 2. Steps S201 to S209 are applicable to the sensors. For example, the sensors may be the ambient light sensors, the proximity sensors or other sensors including photoelectric components, but the present disclosure is not limited thereto. After step S113, step S121, step S127 or step S129 is performed, steps S201 to S209 can be performed by the computing architecture as shown in FIG. 4. That is, after the correction value is calculated, the output value of the averager is calculated based on the correction value.

In step S201, the correction value of the nth piece of data that is calculated in step S113, step S121, step S127 or step S129 is divided by the value "N" to calculate a first calculated value.

In step S203, the first calculated value calculated in step S201 is subtracted from the correction value of the nth piece of data to calculate a second calculated value.

As shown in FIG. 4, in a stage P123, 1/N times of the correction value of the nth piece in a stage P13 is subtracted from the correction value of the nth piece of data in a stage P12 by the subtractor, or 1/N times of a negative value of the correction value of the nth piece of data and the correction value of the nth piece of data are added up by an adder.

In step S205, the second calculated value calculated in step S203 and the value of the nth piece of input data are added up to calculate a third calculated value. As shown in FIG. 4, in a stage P104, the value calculated in step S123 and the value of the nth piece of input data are added up, for example, by the adder.

In step S207, the third calculated value in step S205 is divided by the value "N", to calculate the output value of the averager in step S209. As shown in FIG. 4, in a stage P14, the value calculated in step S104 is divided by the value "N" to finally calculate the output value of the averager.

The above-mentioned calculation performed in steps S201 to S209 are represented by the following equation:

$$Davg(n) = \frac{1}{N}\left[Reg(n) - \frac{1}{N} \times Reg(n) + Din(n)\right],$$

in which Davg(n) represents the output value of the averager, N represents the number of data of the averager, Reg(n) represents the correction value of the nth piece of data, and Din(n) represents the value of the nth piece of input data.

Figure 3:
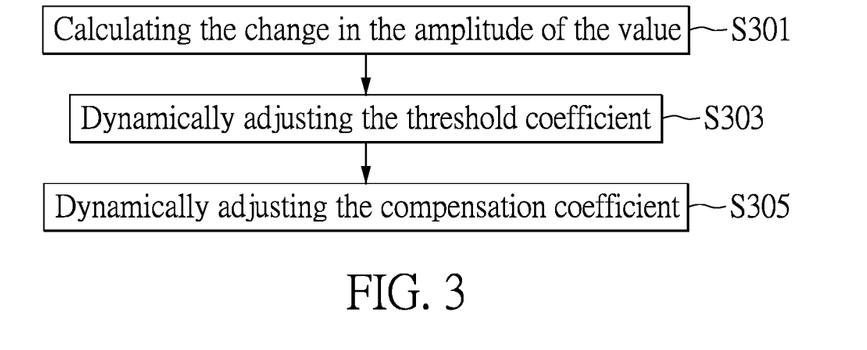
FIG. 3 is a third flowchart diagram of the method of improving performance of the averager according to the embodiment of the present disclosure.

Reference is made to FIGS. 3 and 4, in which FIG. 3 is a third flowchart diagram of the method of improving performance of the averager according to the embodiment of the present disclosure, and FIG. 4 is a schematic diagram of a computing architecture of the method of improving performance of the averager according to the embodiment of the present disclosure.

In the embodiment of the present disclosure, the method of improving performance of the averager may include steps S301 to S305 as shown in FIG. 3. Steps S301 to S305 are applicable to the sensors. For example, the sensors may be the ambient light sensors, the proximity sensors or other sensors including the photoelectric components, but the present disclosure is not limited thereto. Steps S301 to S305 can be performed by the computing architecture as shown in FIG. 4. It should be understood that, an order and contents of steps described herein can be appropriately adjusted or omitted.

In step S301, a change in an amplitude of the nth piece of input data is calculated.

In step S303, the threshold coefficient is dynamically adjusted according to the change in the amplitude of the nth piece of input data.

In step S305, the compensation coefficient is dynamically adjusted according to the change in the amplitude of the nth piece of input data.

Figure 5:
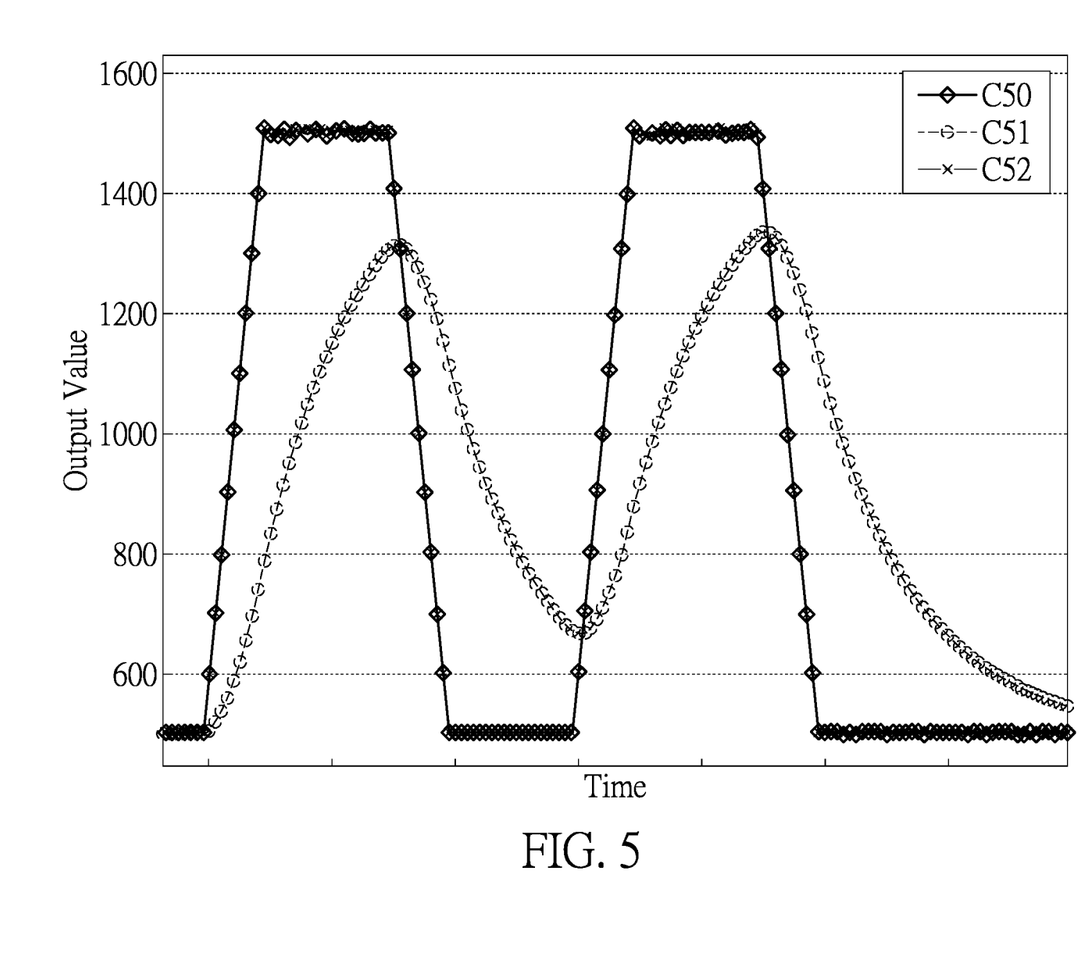
FIG. 5 is a schematic diagram of a curve of an output value of the averager of the embodiment of the present disclosure to an amount of data and a curve of an output value of a conventional averager to the amount of data.

Reference is made to FIG. 5, which is a schematic diagram of a curve of an output value of the averager of the embodiment of the present disclosure to an amount of data and a curve of an output value of a conventional averager to the amount of data.

As shown in FIG. 5, in a curve diagram, a curve C50 is a curve of a value of original data to the amount of data, and a curve C51 is a curve of the output value of the conventional averager to the amount of data. It is apparent that, a response time is required for the conventional averager to generate the output value, and a large difference is between the output value generated by the conventional averager and a value of the original data. A curve C52 is a curve of the output value of the averager of the present disclosure to the amount of data. The output value of the averager of the present disclosure changes with an input signal having a large amplitude. If the large amplitude is not in the input signal, the output value of the averager of the present disclosure is a stable value.

Figure 6:
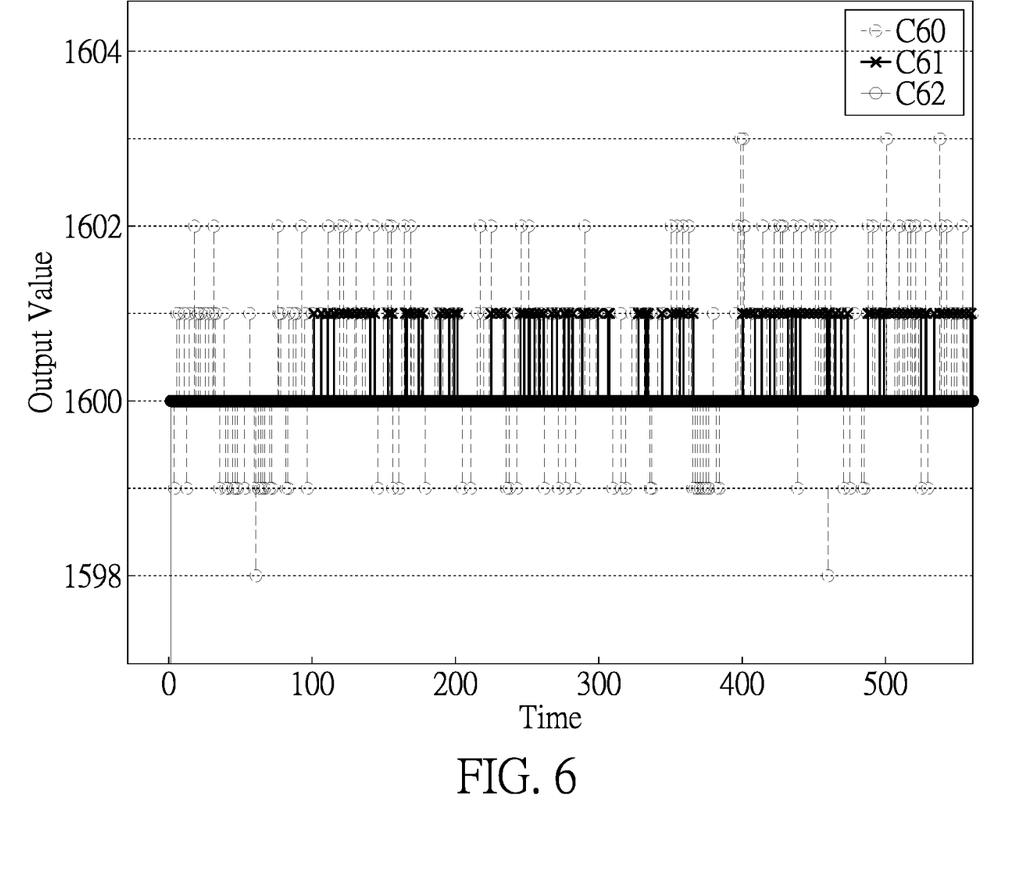
FIG. 6 is a schematic diagram of a curve of the output value of the averager of the embodiment of the present disclosure in relationship to the amount of data and a curve of an output value of original output signal having noise in relationship to the amount of data.

Reference is made to FIG. 6, which is a schematic diagram of a curve of the output value of the averager of the embodiment of the present disclosure to the amount of data and a curve of an output value of original output signal having noise to the amount of data.

As shown in FIG. 6, in the curve diagram, a curve C60 is a curve of the original output signal having noise to the amount of data. A curve C61 is a curve of the output value of the averager of the present disclosure to the amount of data when the compensation coefficient is set to "0". A curve C62 is a curve of the output value of the averager of the present disclosure to the amount of data when the compensation coefficient is set to "2". It is apparent that, if the compensation coefficient is set and the compensation coefficient is not equal to "0", the noise can be effectively filtered from the output value of the averager.

In summary, the present disclosure provides the method of improving performance of the averager, which has the following characteristics:

1. the sensor such as the ambient light sensor or the proximity sensor senses the multiple pieces of sensing data, and inputs the multiple pieces of sensing data to the averager as the multiple pieces of input data;
2. the compensation coefficient and the threshold coefficient are set and used to reduce effects of the noise on the output value of the averager;

3. the compensation coefficient and the threshold coefficient are automatically updated in real time according to the change in the amplitude of the input data;
4. only the simple arithmetic operations need to be performed on the piece of input data being currently read and the previous piece of input data for a short period of time, and a small amount of a space of a register is occupied;
5. a digital filter or other digital processors can be used together with the averager to perform operations on the data; and
6. the method of the present disclosure can be performed by a digital hardware circuit or a software.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method of improving performance of an averager, wherein the averager includes an OR gate, a subtractor and a plurality of adders, and the subtractor is connected to a sensor that is an ambient light sensor or a proximity sensor and includes a photoelectric component, the method comprising processes of:
   by the sensor, sensing n pieces of sensing data;
   by the subtractor, receiving the n pieces of sensing data from the sensor as n pieces of input data;
   by the subtractor, sequentially reads the n pieces of input data from the sensor, wherein the number of the sensing data is an integer;
   by the subtractor, calculating a difference between an nth piece of the input data and an (n−1)th piece of output data of the averager;
   by the subtractor, outputting a value representing that the difference between the nth piece of the input data and the (n−1)th piece of output data is larger than a positive threshold coefficient to one of two input terminals of the OR gate; and
   by the subtractor, outputting a value representing that the difference between the nth piece of the input data and the (n−1)th piece of output data is smaller than a negative threshold coefficient to the other of the two input terminals of the OR gate;
   wherein when the difference between the nth piece of the input data and the (n−1)th piece of output data of the averager is larger than the positive threshold coefficient or smaller than the negative threshold coefficient, the OR gate outputs a logic value "1";
   wherein when the OR gate outputs the logic value "1" and the difference between the nth piece of the input data and the (n−1)th piece of output data of the averager is larger than a reference value, using yet another one of the plurality of adders to add a negative compensation coefficient to a temporary value being equal to N times the (n−1)th piece of output data to obtain a value as the correction value, using the one of the plurality of adders to add 1/N times the negative value of the correction value to the correction value, and using the another of the plurality of adders to add up the value outputted by the one of the plurality of adders and the n-th input data;
   wherein when the OR gate outputs the logic value "1" and the difference between the nth piece of the input data and the (n−1)th piece of output data of the averager is smaller than the reference value, using other of the plurality of adders to add a positive compensation coefficient to the temporary value being equal to N times the (n−1)th piece of output data to obtain a value as the correction value, using the one of the plurality of adders to add 1/N times the negative value of the correction value to the correction value, and using the another of the plurality of adders to add up the value outputted by the one of the plurality of adders and the n-th input data.

2. The method according to claim 1,
   wherein the reference value is a zero value.

3. The method according to claim 1, further comprising process of:
   when the difference between the nth piece of the input data and the (n−1)th piece of output data of the averager is larger than a positive threshold coefficient or smaller than a negative threshold coefficient, using N times of the nth piece of input data among the n pieces of input data as the correction value by the one of the plurality of adders, using the one of the plurality of adders to add the 1/N times of the negative value of the correction value to the correction value, and using the another of the plurality of adders to add up the value outputted by the one of the plurality of adders and the n-th input data.

4. The method according to claim 3, wherein
   the positive threshold coefficient is equal to an absolute value of the negative threshold coefficient.

* * * * *